United States Patent
Ould

(10) Patent No.: US 8,149,085 B2
(45) Date of Patent: Apr. 3, 2012

(54) COORDINATED SECURITY SYSTEMS AND METHODS FOR AN ELECTRONIC DEVICE

(75) Inventor: Christopher James Ould, Hamilton (CA)

(73) Assignee: Research In Motion Limited, Waterloo, Ontario (CA)

( * ) Notice: Subject to any disclaimer, the term of this patent is extended or adjusted under 35 U.S.C. 154(b) by 844 days.

(21) Appl. No.: 12/113,977

(22) Filed: May 2, 2008

(65) Prior Publication Data

US 2009/0273435 A1 Nov. 5, 2009

(51) Int. Cl.
*G05B 19/00* (2006.01)

(52) U.S. Cl. ........ 340/5.31; 340/5.3; 713/166; 713/169; 713/170; 713/193; 370/338; 455/558

(58) Field of Classification Search ............ 340/5.3, 340/5.31; 713/166, 169, 170, 193; 370/338; 455/558

See application file for complete search history.

(56) References Cited

U.S. PATENT DOCUMENTS

| | | | | |
|---|---|---|---|---|
| 6,009,524 A * | 12/1999 | Olarig et al. | ..................... | 726/10 |
| 6,055,636 A * | 4/2000 | Hillier et al. | ..................... | 726/34 |
| 6,741,872 B1 * | 5/2004 | Pinault | ......................... | 455/564 |
| 6,804,699 B1 * | 10/2004 | Henrie | ......................... | 709/203 |
| 6,874,087 B1 * | 3/2005 | Fetkovich et al. | ............. | 726/23 |
| 7,276,758 B2 * | 10/2007 | Kim | .............................. | 257/315 |
| 7,546,404 B2 * | 6/2009 | Yeh et al. | ....................... | 710/117 |
| 7,607,575 B2 * | 10/2009 | Kingsborough et al. | ..... | 235/380 |
| 7,853,786 B1 * | 12/2010 | Fultz et al. | ..................... | 713/166 |
| 2001/0029581 A1 * | 10/2001 | Knauft | ........................... | 713/193 |
| 2003/0108204 A1 * | 6/2003 | Audebert et al. | ............. | 380/277 |
| 2006/0021006 A1 * | 1/2006 | Rensin et al. | ..................... | 726/2 |
| 2007/0162752 A1 * | 7/2007 | Baliga et al. | .................... | 713/169 |
| 2007/0254713 A1 * | 11/2007 | Lagnado et al. | .............. | 455/558 |
| 2008/0313401 A1 * | 12/2008 | Kang | ............................. | 711/115 |
| 2009/0092248 A1 * | 4/2009 | Rawson | ......................... | 380/45 |
| 2010/0027516 A1 * | 2/2010 | Nagarajan | ..................... | 370/338 |
| 2010/0095079 A1 * | 4/2010 | Kang | ............................. | 711/162 |
| 2011/0022843 A1 * | 1/2011 | Blom et al. | .................... | 713/169 |

FOREIGN PATENT DOCUMENTS

WO 2007110094 A 10/2007

OTHER PUBLICATIONS

Research in Motion Limited, "BlackBerry Enterprise Solution—Security Technical Overview—for BlackBerry Enterprise Server Version 4.1 Service Pack 6 and BlackBerry Device Software Version 4.6" pp. 12-20. Available online:http://na.blackberry.com/eng/deliverables/4133/BB_Ent_Soln_Security_4.1.6_STO.pdf.

(Continued)

*Primary Examiner* — George Bugg
*Assistant Examiner* — Paul Obiniyi
(74) *Attorney, Agent, or Firm* — Bereskin & Parr LLP/S.E.N.C.R.L., s.r.l.

(57) ABSTRACT

Systems and methods for implementing security features of a mobile electronic device. The mobile electronic device comprises a first security module configured to implement a first security operation and a second security module configured to implement a second security operation. The method includes: detecting a first security event; implementing a first security operation by the first security module; triggering a second security event; and implementing a second security operation by the second security module. The first security operation includes triggering the second security event.

24 Claims, 5 Drawing Sheets

OTHER PUBLICATIONS

Research in Motion Limited, "BlackBerry Wireless Handheld—Version 4.1—User Guide" pp. 9-158. Available online: http://na.blackberry.com/eng/deliverables/791/userguide_bb7520.pdf.

PIN and PUK take care of security. 2007, pp. 1-2. Available online: http://web.archive.org/web/20070718112819/customer.proximus.be/en/My_Sim_Card/MSC_Pin_Puk.html.

Research in Motion Limited, "BlackBerry—Application Security for Java-based BlackBerry Handhelds" pp. 1-5. Available online: http://www.blackberry.com/developers/pdfs/Application_Security_for_Java-based_BlackBerry_Handhelds.pdf.

"Mobile Phone FAQs—Phone Unblocked, PIN, PUK Code, Deal Order delivery, Order Status, Lost Missing Phone Numbers". Accessed on May 24, 2007 from http://www.mobilerainbow.co.uk/faq_general.asp.

"ETSI TS 100 977 V8.13.0 (Jun. 2005)—Digital cellular telecommunications system (Phase 2+); Specification of the Subscriber Identity Module—Mobile Equipment (SIM-ME) Interface (3GPP TS 11.11 version 8.13.0 Release 1999)". Available online: http://www.eliss.org/download/file/viewfile.php?idfile=81.

Research in Motion Limited, "BlackBerry Enterprise Solution Security—Acronym Glossary" pp. 2-7. Available online: http://na.blackberry.com/eng/deliverables/3335/BlackBerry_Enterprise_Solution_Security_Acronym_Glossary.pdf.

Research in Motion Limited, "BlackBerry Enterprise Solution Security—Release 4.1.2—Technical Overview" pp. 5-61. Available online: http://www.blackberry.com/btsc/search.do?cmd=displayKC&docType=kc&externalId=10008339&sliceId=&dialogID=99933420&stateId=0%200%2099931122.

Research in Motion Limited, "BlackBerry Enterprise Server—All Versions—Policy Reference Guide" pp. 1-114. Available: http://blackberry.interchangegroup.com/BES_Policy_Reference_Guide.pdf.

European Examination and Search Report (Application No. 08155575.7) dated Oct. 22, 2008.

Canadian Office Action. Corresponding Canadian Application No. 2,665,018, dated Nov. 7, 2011.

Communication under Rule 71(3) EPC (Intent of Grant) issued on a corresponding European Application No. 08155575.7, dated Jan. 25, 2012.

* cited by examiner

COORDINATED SECURITY SYSTEMS AND METHODS FOR AN ELECTRONIC DEVICE

TECHNICAL FIELD

Embodiments described herein relate generally to the operation of security features on mobile electronic devices.

BACKGROUND

Mobile electronic devices are often equipped with a smart card such as a Subscriber Identity Module or "SIM" card in order to send and receive communication signals (such as a cellular phone call). Typically, such SIM cards require network registration and activation procedures involving the use of passwords. Similarly, the use of passwords or other security features may be used to limit or restrict access to the SIM card functionality.

Additionally some electronic devices also provide application functionality which is independent of the SIM card. For example, some devices include device applications which provide address book functionality, scheduling and calendar functionality, video games, digital camera picture-taking and viewing, and multi-media presentations, among others. Often, such applications involve the storing and use of user data or content. Access to these applications and user data is typically restricted or regulated using passwords or other security features.

In the event that an unauthorized user obtains the device and enters an invalid password to the device (often the user is provided multiple opportunities to enter a valid password), the security features delete or otherwise restrict access to the user data and may prevent further use of the device applications.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Figure 1:
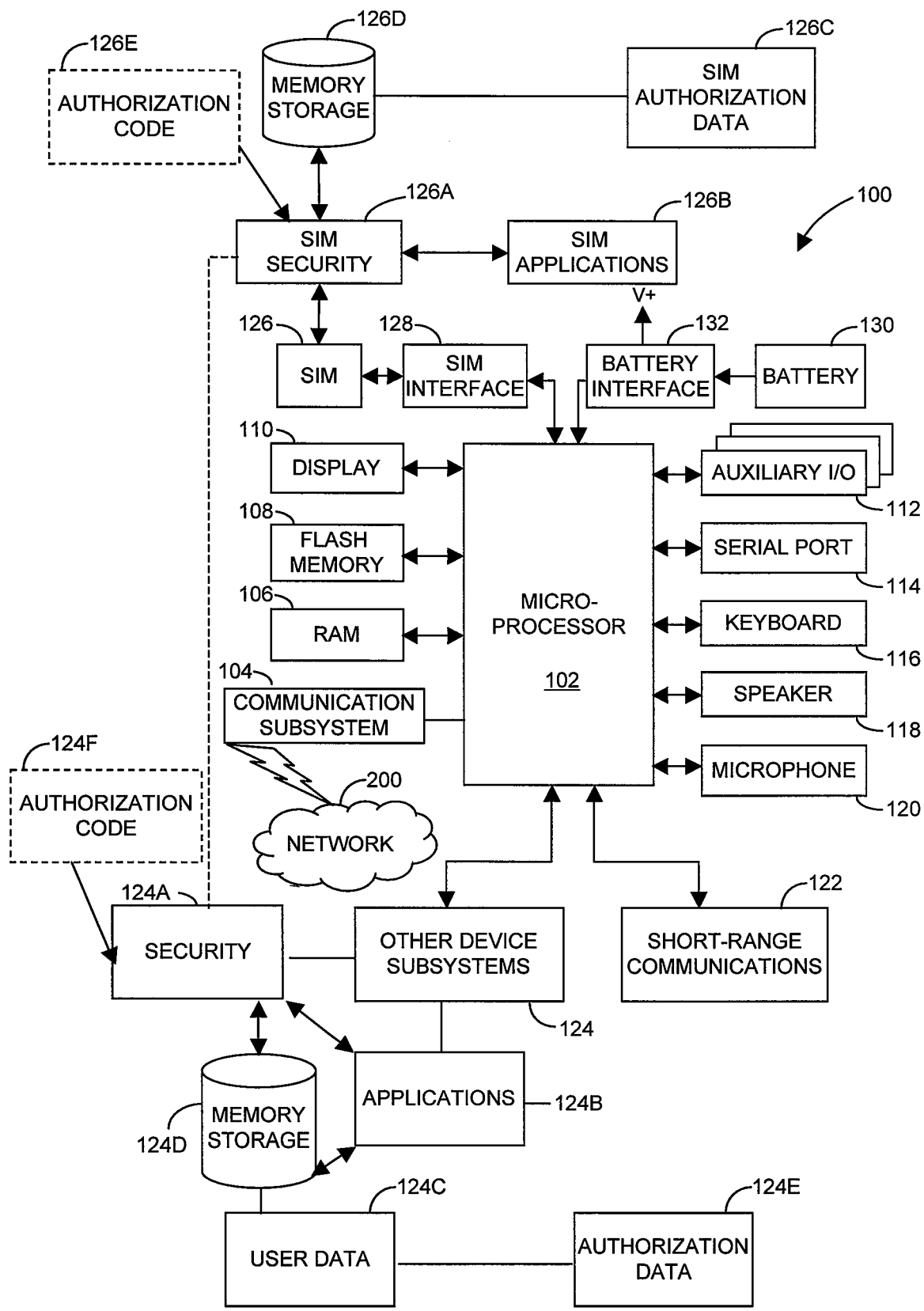
FIG. 1 is a block diagram of a mobile device in one example implementation.

While certain embodiments of existing mobile electronic devices provide for the disabling of device applications upon receipt of an invalid password, the applicant has noted that the SIM card may remain unaffected. As a result, a thief of the device may be able to continue to utilize the communication functionality until the communication network administrators are notified and the SIM card is blocked from accessing the network or otherwise deactivated.

Furthermore, the applicant has also noted that in addition to SIM cards, other types of communication cards may be used in mobile electronic device applications. Accordingly, by way of example only, other types of communication cards which might be used may include an R-UIM (removable user identity module) or a CSIM (CDMA (code division multiple access) or CDMA 2000 subscriber identity module) or a USIM (universal subscriber identity module) card.

Embodiments described herein are generally directed to a system and method that coordinates two or more typically separate security measures or operations of a mobile communications system. In particular, the activation of a first security measure may trigger the activation of a second security measure.

In a broad aspect, there is provided a method for implementing security features of a mobile electronic device. The mobile electronic device may comprise a first security module configured to implement a first security operation and a second security module configured to implement a second security operation. The method includes: detecting a first security event; initiating a first security operation by the first security module; triggering a second security event; and initiating a second security operation by the second security module. The first security operation may include triggering the second security event.

In one embodiment of the method, detecting the first security event is performed by a first security module. Upon detecting the first security event, the first security module causes the second security module to implement the second security operation.

In some embodiments, initiating the second security module may comprise disabling the functionality of a communication card. For example, the communication card may comprise a SIM card, an R-UIM card, a CSIM card, and/or a USIM card.

In some instances, detecting the first security event comprises receiving an authorization code and determining that the authorization code does not correspond to previously stored authorization data.

A computer-readable medium comprising instructions executable on a processor of the computing device for implementing the methods, is also provided.

In another aspect, a mobile electronic device having coordinated security features is provided. The system includes: a first application module configured to provide first application functionality; a first security module coupled with the first application module, the first security module configured to regulate the provision of the first application functionality by the first application module; a second application module configured to provide second application functionality; and a second security module coupled with the second application module and the first security module, the second security module configured to regulate the provision of the second application module.

In some instances, the first security module is configured to detect a first security event. The second security module may be configured to detect a second security event. The first security module may be configured to implement a first security operation upon detecting said first security event, and the second security module may be configured to implement a second security operation upon detecting said second security event.

The first security operation may comprise triggering the second security event to be detected by the second security module, and the second security module is configured to disable the second application functionality when implementing the second security operation.

The device may comprise a user data storage configured to store user data and the first security module is configured to disable access to the user data when implementing the first security operation.

In some cases, the device is provided with authorization data storage configured to store authorization data, and the first security module is further configured to receive a first authorization code and compare the first authorization code to first authorization data stored in the authorization data storage. The first security module is further configured to implement a first security operation upon determining that the first authorization code does not correspond to the first authorization data.

The second security module may be further configured to receive a second authorization code and compare the second authorization code to second authorization data stored in the authorization data storage. The second security module may further be configured to implement a second security operation upon determining that the second authorization code does not correspond to the second authorization data.

In another aspect, a method for implementing security features of a mobile electronic device is provided. The mobile electronic device includes a communication card configured to provide a functionality; a first security module configured to implement a first security operation; and a second security module configured to implement a second security operation, The method comprises: detecting a first security event by the first security module, wherein the first security event comprises receiving an invalid authorization code. The method also includes implementing a first security operation by the first security module, wherein the first security operation comprises triggering a second security event. The method further includes implementing a second security operation by the second security module upon the triggering of the second security event, wherein the second security operation comprises disabling the functionality of the communication card.

These and other aspects and features of various embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
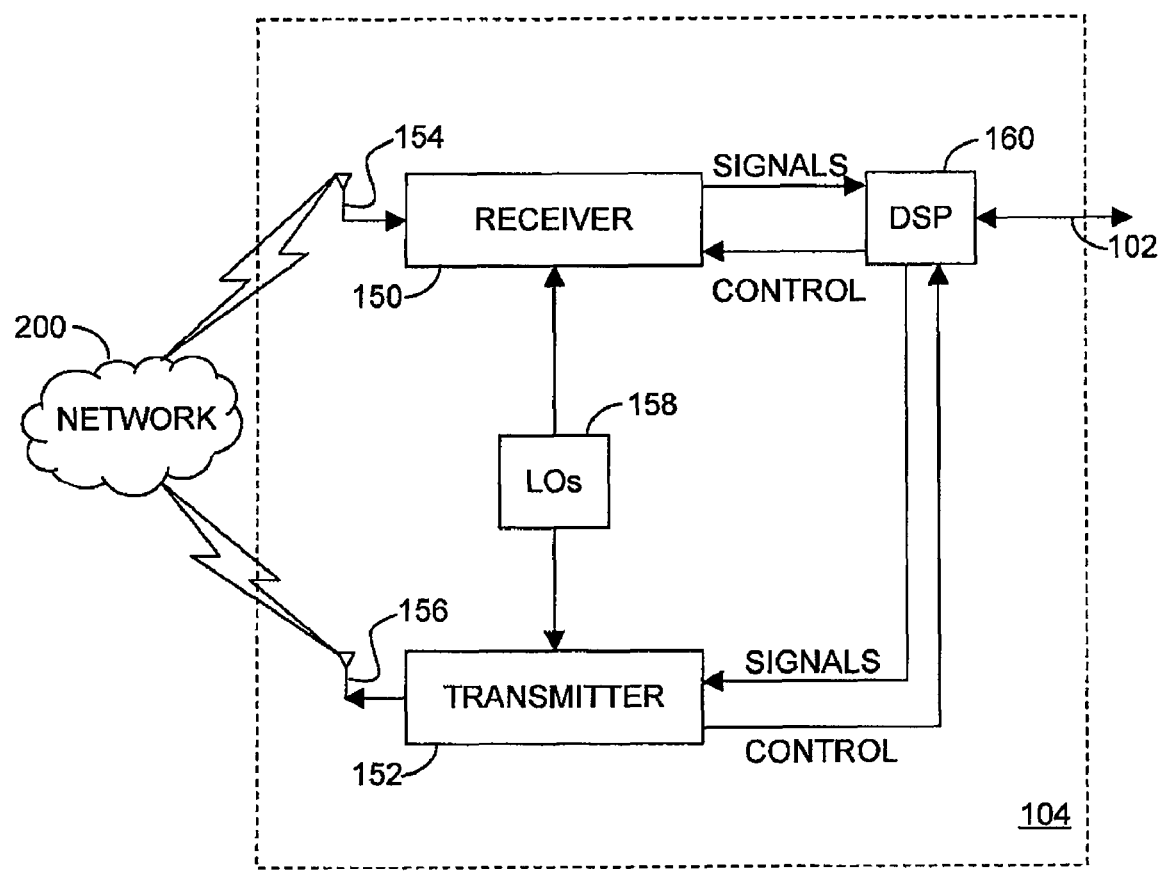
FIG. 2 is a block diagram of a communication subsystem component of the mobile device of FIG. 1.
Figure 3:
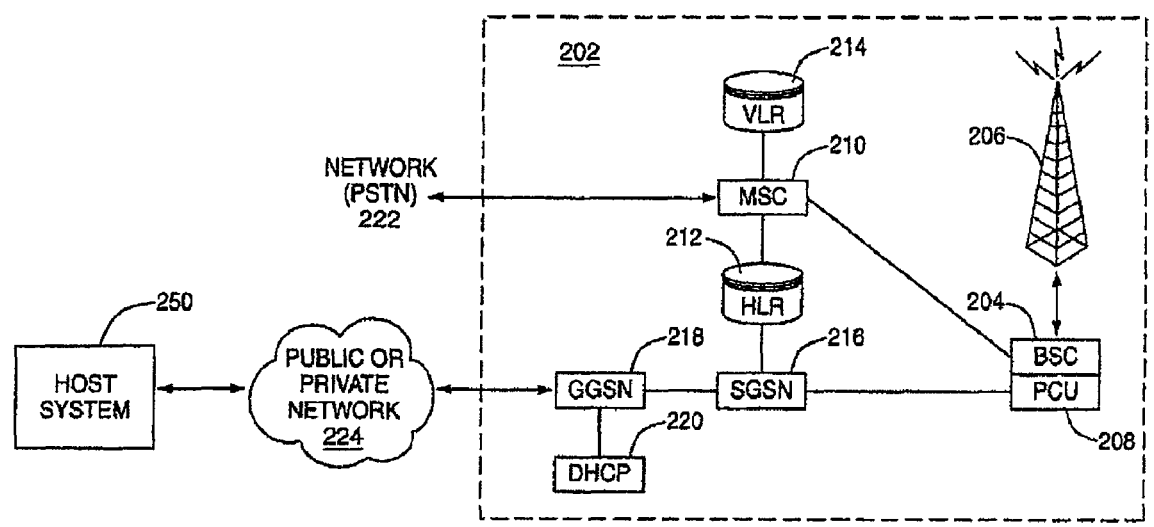
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards may be supplemented or eventually superseded by newer standards such as Enhanced Data GSM Environment (EDGE) and Universal Mobile Telecommunications Service (UMTS), High-Speed Packet Access (HSPA) which may include High-Speed Downlink Packet Access (HSDPA), and Ultra Mobile Broadband (UMB), etc. New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) networks, or CDMA2000 networks, Evolution Data Only (EV-DO) networks, GSM/GPRS networks (as mentioned above), and third-generation (3G) and beyond networks like EDGE, UMTS and HSPA, etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

The subsystems 124 may include at least one suitably programmed subsystem security module 124A configured to regulate access to one or more of the resident applications and/or functionality 124B. As note above, for example, such resident applications 124B may include a PIM to provide address book functionality, scheduling and calendar functionality, video games, digital camera picture-taking and viewing, and multi-media presentations, among others. Often, such applications involve the storing and use of user data or content 124C including application preferences and settings. As will be understood, such user content 124C may be stored in whole or in part in the flash memory 108, ROM or other appropriate (typically resident) data storage, referred to generally as 124D.

Access to these applications 124B and user data 124C may be restricted or regulated by the security module 124A involving the use of passwords or other security features. Such password functionality may include the storing of authorization data 124E (which may be stored in the data storage 124D or elsewhere). In order to utilize the applications 124B and access the user data 124C, the security module 124A may be programmed to require the user to enter a password or otherwise provide an authorization code 124F from time to time (typically via the display 110 and keyboard 116 although other mechanisms may be used), which is received by the security module 124A and compared to the authorization data 124E.

In certain embodiments, the security module 124A may be operatively coupled to or otherwise in communication with a biometric authorization component, for example, a retinal scanner or a fingerprint scanner (although other biometric scanners might be used), configured to receive unique biometric information from a user in order to confirm the user's identity. In such embodiments, the authorization data 124E might comprise the biometric information of one or more authorized users, while the authorization code 124F might comprise the scanned biometric information from a current user of the device 100.

In the event an authorization code 124F is received by the security module 124A which does not match or otherwise correspond to the authorization data 124E (illustrating one example of a "security event"), access to the user data 124C may be restricted (for example, the user data 124C may be encrypted or deleted), and the user may be prevented from accessing the application functionality 124B (such processes may be considered "security operations"). An alternate example of a security event could be the sending of a specially configured electronic message comprising control instructions, by a network administrator (such as an administrator of the LAN 250 described below). Receipt of such a message may cause the triggering of a security event and the corresponding security operation features discussed below.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module or "SIM" card 126 to be inserted in a SIM interface 128 in order to communicate with a network. SIM 126 is one type of a conventional "smart card" or communication card used to identify a subscriber of mobile device 100 and to personalize the mobile device 100, among other things. In some alternate embodiments, the mobile device 100 may comprise an iDEN (Integrated Digital Enhanced Network) handset, which incorporates the use of SIM cards.

In addition to SIM cards, other types of communication cards may be used in mobile electronic device applications. By way of example only, in alternate embodiments, other types of communication cards which might be used in addition to or in place of SIM cards may include an R-UIM (removable user identity module) or a CSIM (CDMA (code division multiple access) subscriber identity module) or a USIM (universal subscriber identity module) card.

Without SIM 126, mobile device 100 may not be fully operational for communication with network 200. By inserting SIM 126 into SIM interface 128, a subscriber can access all subscribed services. Services may include without limitation: web browsing and messaging such as e-mail, voice mail, Short Message Service (SMS), and Multimedia Messaging Services (MMS), and peer-to-peer messages such as PIN-to-PIN which may also be referred to simply as PIN messages. As used in this context, a PIN (personal identification number) generally refers to a number that uniquely identifies the mobile device 100, and a PIN message generally refers to a message addressed to one or more PIN numbers. More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

The SIM 126 may include at least one suitably programmed SIM security module 126A configured to regulate access to one or more of the communication functionality 124B noted previously.

Access to the SIM communication applications and functionality 126B may be restricted or regulated by the security module 126A involving the use of passwords or other security features. Such password functionality may include the storing of SIM authorization data 126C such as a PIN (personal identification number) (which may be stored in the data storage 124D, but will often be stored in SIM data storage 126D resident on the SIM card 126). Such PIN data 126C will often be in addition to the PUK ("personal unblocking key") data which is uniquely assigned to the SIM card 126, as will be understood.

In order to utilize the communication applications and functionality 126B, the SIM security module 126A may be programmed to require the user to enter a password or otherwise provide an authorization code 126E from time to time (typically via the display 110 and keyboard 116 although other mechanisms may be used), which is received by the security module 126A and compared to the authorization data 126C. In the event an authorization code 126E is received by the security module 126A which does not match or otherwise correspond to the authorization data 126C (also a "security event"), further access to the communication functionality may be prevented. Typically, a user is given multiple attempts (e.g., three) to enter an acceptable authorization code 126E, before the communication functionality is deactivated (a "security operation").

In addition, the subsystem security module 124A is operatively coupled to the SIM security module 126A, typically via the microprocessor 102. In the case of a security event being detected by the subsystem security module 124A, the security module 124A is programmed to include in its security operations the triggering of a security event for the SIM security module 126A to detect. For example, the subsystem security module 124A may be programmed to trigger the password function of the SIM security system 126A and enter one or more invalid authorization codes 126E until the communication functionality is disabled.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. Keyboard 116 may comprise a virtual keyboard or a physical keyboard or both. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 may be keyed or turned on only when it is sending to network 200 may otherwise turned off to conserve resources. Similarly, receiver 150 may be periodically turned off to conserve power until it is needed to receive signals or information (if at all) during designated time periods.

Referring now to FIG. 3, a block diagram of a node of an exemplary wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather serves as a list of components that are commonly used in communications through network 200, for ease of illustration.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 comprises a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support namely, packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
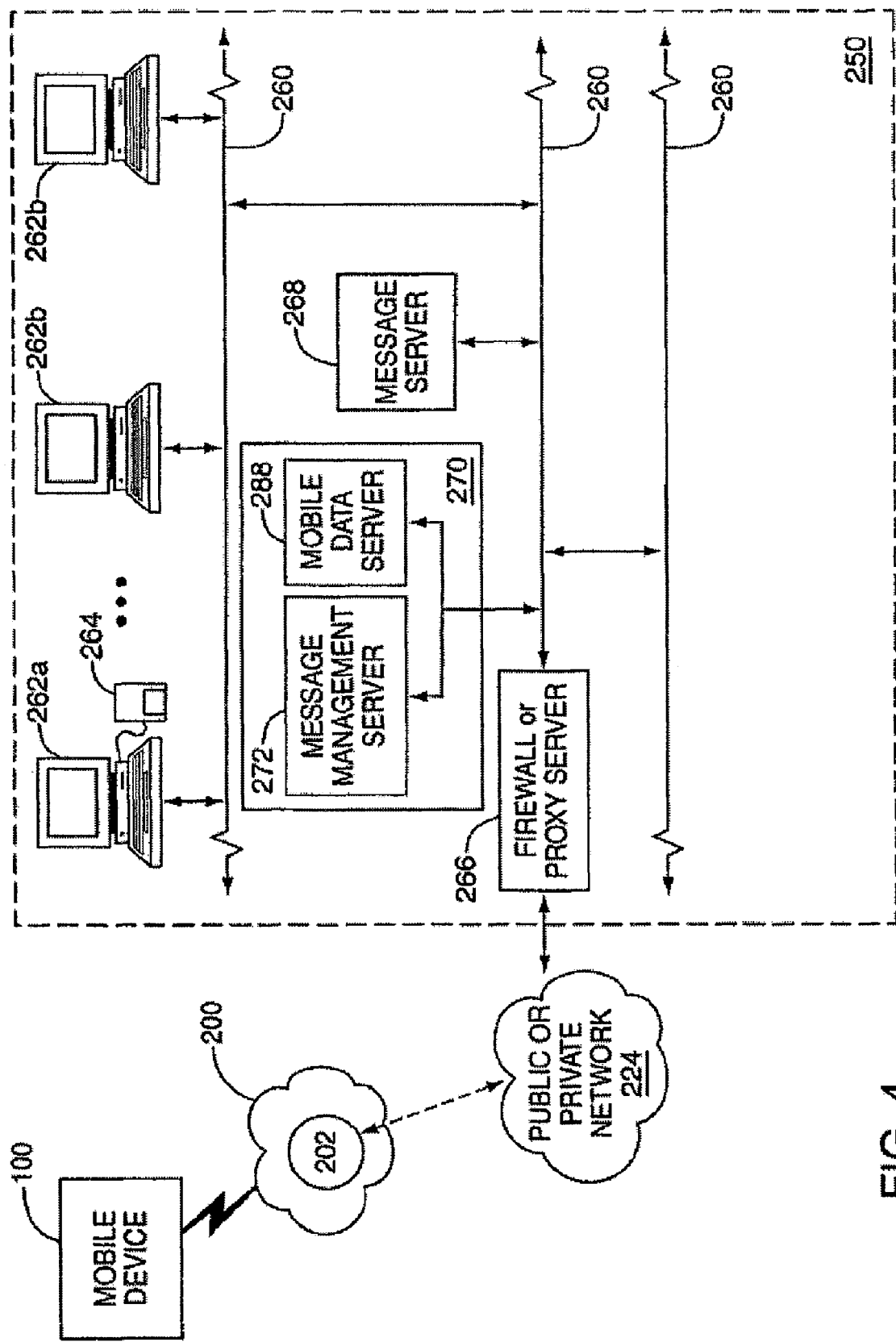
FIG. 4 is a block diagram illustrating components of a host system in one example configuration.

Referring now to FIG. 4, a block diagram illustrating components of a host system in one example configuration is shown. Host system 250 may typically be, for example a corporate office or other local area network (LAN), but may instead be a home office computer or some other private system, for example, in variant implementations. As other examples, the host system 250 may comprise a LAN controlled by a governmental, healthcare, financial, or educational institution. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262*a* which may be connected to an accompanying cradle 264 for the user's mobile device 100 is situated on LAN 250. Cradle 264 for mobile device 100 may be coupled to computer 262*a* by a serial or a Universal Serial Bus (USB) connection, for example. Other user computers 262*b* are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262*a* to mobile device 100, and may be particularly useful for bulk information updates often performed in initializing mobile device 100 for use. The information downloaded to mobile device 100 may include certificates used in the exchange of messages. It will be understood by persons skilled in the art that user computers 262*a*, 262*b* will typically be also connected to other peripheral devices not explicitly shown in FIG. 4.

Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272 and mobile data server 288, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices is supported.

Figure 5:
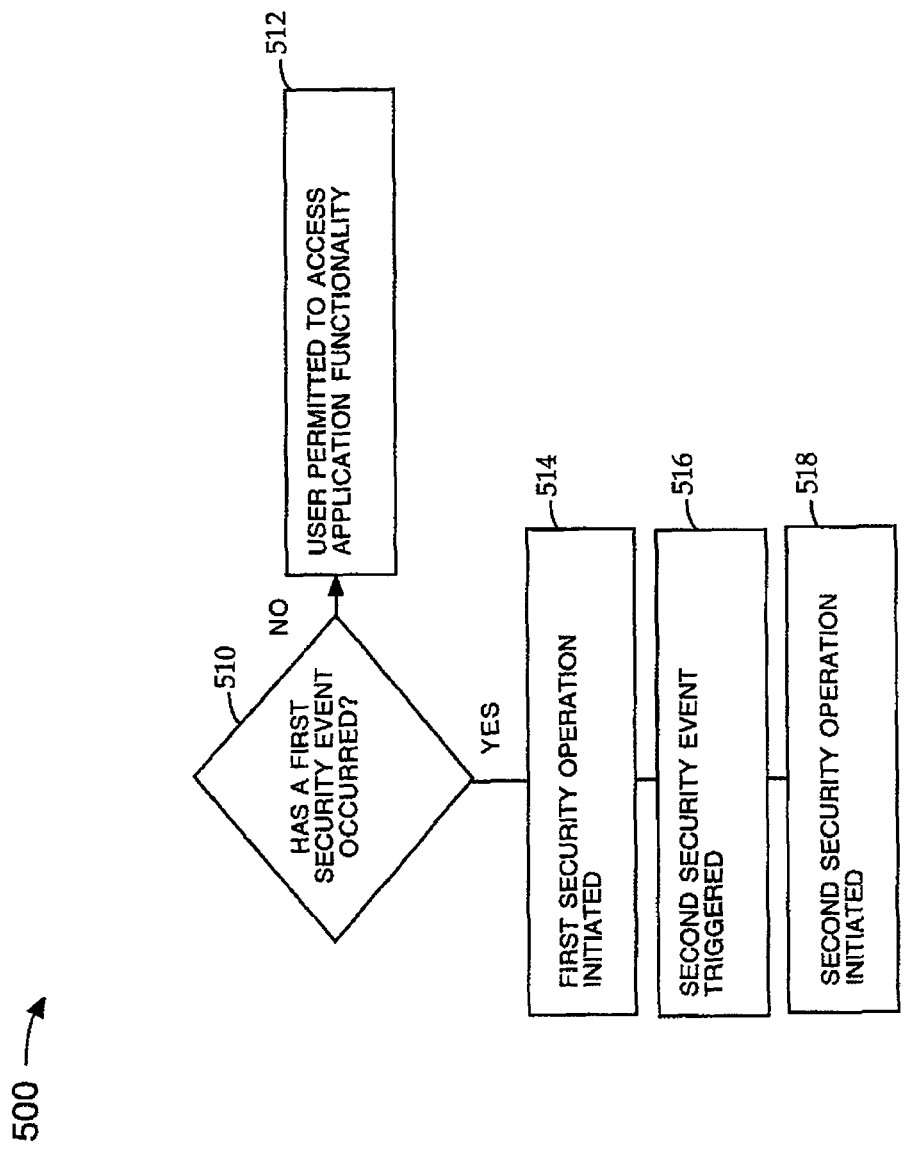
FIG. 5 is a flowchart illustrating steps in a method of coordinating security systems of a computing device in accordance with at least one embodiment.

Referring now to FIG. 5, a flowchart illustrating steps in a method of implementing the security features of a mobile device in accordance with at least one embodiment is shown generally as 500. Additional details of some of the features described below in respect of the steps of method 500 may be described earlier in the present specification.

The steps of method 500 are performed at the computing device. In one embodiment, at least some of the steps of the method are performed by one or more security modules that execute and reside on a mobile device (e.g. mobile device 100 of FIG. 1). Furthermore, the security modules need not be stand-alone applications, and the functionality of the security modules may be implemented in one or more applications executing and residing on the mobile or other computing device.

Generally, in method 500, a security event detected by one security module causes the triggering of the security features provided by another security module. The steps of method 500 are described in further detail below.

Method 500 commences at block 510 with the security module 124A determining if a security event has occurred. For example, the detection of such a security event may result from the user attempting to access application functionality 124B and has been prompted by the subsystem security module 124A to input an authorization code 124F, such as a password. The security module 124A determines if the authorization code 124F corresponds to the authorization data 124E. Alternatively, as previously noted, a network administrator may trigger a security event by sending an appropriately configured security message to the device 100.

As noted above, in certain embodiments, the authorization code 124F might alternately or additionally comprise biometric data from the current user. Accordingly, in such an embodiment, an invalid authorization code as contemplated in block 510 may involve, for example, a fingerprint swipe from the user which fails to match an authorized fingerprint swipe stored in data storage 124D.

If no security event is detected, at block 512, the user is permitted to access the application functionality. For example, if the authorization code 124F received by the security module 124A matches or otherwise corresponds to the authorization data 124E, the user's authorization is confirmed. Thus, the user is permitted to access the application functionality 124B. However, if a security event is detected, at block 514 the first security operation is initiated. For example, if the authorization code 124F is invalid as it does not match or otherwise correspond to the authorization data 124E, the security module 124A is programmed to effect one or more security operations. Such security operations may include preventing access to the user data 124C and to the applications 124B. As noted previously, this step may involve the encryption or deletion of the user data 124C. As well, as previously suggested, the user may be given multiple opportunities to enter an authorization code 124F which corresponds to the authorization data 124E.

At block 516, the first security operation also includes triggering a second security event. At block 518, the second security event initiates the second security operation. For example, such a second security event may be triggered by the first security module 124A entering one or more invalid SIM authorization codes 126E until the SIM security module's 126A programming initiates its security operation, such as for example disabling the SIM card 126 and its communication functionality.

Subsequent to the disabling of the SIM card 126 in block 516, in certain embodiments, the user may contact the communication network administrators to unblock the SIM card 126 to reestablish its communication functionality and allow the SIM card 126 to access the network.

While the example embodiments discussed herein illustrate the interconnection of a subsystem security module 124A with a SIM security module 126A, it should be understood that two or more security modules regulating access to different applications' functionality may be interconnected in accordance with the teaching set out herein.

As will be understood, in the event a thief or an otherwise unauthorized individual obtains possession of the device 100, by such individual entering an invalid password to access one application functionality or otherwise triggering a security event, a domino effect will result with one or more other security modules being activated to detect a corresponding security event and implement its or their security features and restrict access to its or their corresponding application functionality.

The invention has been described with regard to a number of embodiments. However, it will be understood by persons skilled in the art that other variants and modifications may be made without departing from the scope of the invention as defined in the claims appended hereto.

The invention claimed is:

1. A mobile electronic device comprising:
a first application module configured to provide first application functionality;
a first security module coupled with the first application module, the first security module configured to regulate the provision of the first application functionality by the first application module;
a second application module configured to provide second application functionality; and
a second security module coupled with the second application module and the first security module, the second security module configured to regulate the provision of the second application module,
wherein the first security module is configured to detect a first security event,
wherein the second security module is configured to detect a second security event,
wherein the first security module is configured to implement a first security operation upon detecting said first security event, wherein the second security module is configured to implement a second security operation upon detecting said second security event, wherein the first security operation comprises triggering the second security event to be detected by the second security module, and
wherein the second security module is further configured to disable the second application functionality when implementing the second security operation.

2. The mobile electronic device as claimed in claim 1, wherein the device further comprises a user data storage configured to store user data and wherein the first security module is further configured to disable access to the user data when implementing the first security operation.

3. The mobile electronic device as claimed in claim 1, wherein the device further comprises user data storage configured to store user data and wherein first security module is further configured to delete the user data when implementing the first security operation.

4. The mobile electronic device as claimed in claim 1, wherein the first security module is further configured to disable the first application functionality when implementing the first security operation.

5. The mobile electronic device as claimed in claim 1, wherein the device further comprises authorization data storage for storing authorization data and wherein the first security module is further configured to receive a first authorization code and compare the first authorization code to first authorization data stored in the authorization data storage.

6. The mobile electronic device as claimed in claim 5, wherein the first security module is further configured to implement a first security operation upon determining that the first authorization code does not correspond to the first authorization data.

7. The mobile electronic device as claimed in claim 6, wherein the second security module is further configured to receive a second authorization code and compare the second authorization code to second authorization data stored in the authorization data storage.

8. The mobile electronic device as claimed in claim 7, wherein the second security module is further configured to implement a second security operation upon determining that the second authorization code does not correspond to the second authorization data.

9. A method for implementing security features of a mobile electronic device, the method comprising:
    a processor executing instructions of a first application module configured to provide first application functionality;
    the processor executing instructions of a first security module coupled with the first application module, the first security module configured to regulate the provision of the first application functionality by the first application module;
    the processor executing instructions of a second application module configured to provide second application functionality; and
    the processor executing instructions of a second security module coupled with the second application module and the first security module, the second security module configured to regulate the provision of the second application module,
    wherein the first security module is configured to detect a first security event,
    wherein the second security module is configured to detect a second security event,
    wherein the first security module is configured to implement a first security operation upon detecting said first security event, wherein the second security module is configured to implement a second security operation upon detecting said second security event, wherein the first security operation comprises triggering the second security event to be detected by the second security module, and
    wherein the second security module is further configured to disable the second application functionality when implementing the second security operation.

10. The method as claimed in claim 9, providing wherein the first security module is further configured to disable access to user data when implementing the first security operation.

11. The method as claimed in claim 9, wherein the first security module is further configured to delete user data when implementing the first security operation.

12. The method as claimed in claim 9, wherein the first security module is further configured to disable the first application functionality when implementing the first security operation.

13. The method as claimed in claim 9, further comprising storing authorization data and wherein the first security module is further configured to receive a first authorization code and compare the first authorization code to first authorization data stored in the stored authorization data.

14. The method as claimed in claim 13, wherein the first security module is further configured to implement a first security operation upon determining that the first authorization code does not correspond to the first authorization data.

15. The method as claimed in claim 14, wherein the second security module is further configured to receive a second authorization code and compare the second authorization code to second authorization data stored in the stored authorization data.

16. The method as claimed in claim 15, wherein the second security module is further configured to implement a second security operation upon determining that the second authorization code does not correspond to the second authorization data.

17. A computer-readable medium other than a signal, comprising instructions executable on a processor of a mobile device, for implementing security features of the mobile electronic device, the medium comprising:
    a first application module configured to provide first application functionality;
    a first security module coupled with the first application module, the first security module configured to regulate the provision of the first application functionality by the first application module;
    a second application module configured to provide second application functionality; and
    a second security module coupled with the second application module and the first security module, the second security module configured to regulate the provision of the second application module,
    wherein the first security module is configured to detect a first security event,
    wherein the second security module is configured to detect a second security event,
    wherein the first security module is configured to implement a first security operation upon detecting said first security event, wherein the second security module is configured to implement a second security operation upon detecting said second security event, wherein the first security operation comprises triggering the second security event to be detected by the second security module, and
    wherein the second security module is further configured to disable the second application functionality when implementing the second security operation.

18. The computer-readable medium as claimed in claim 17, further comprising a user data storage configured to store user data and wherein the first security module is further configured to disable access to the user data when implementing the first security operation.

19. The computer-readable medium as claimed in claim 17, further comprising user data storage configured to store user data and wherein first security module is further configured to delete the user data when implementing the first security operation.

20. The computer-readable medium as claimed in claim 17, wherein the first security module is further configured to disable the first application functionality when implementing the first security operation.

21. The computer-readable medium as claimed in claim 17, wherein the device further comprises authorization data storage for storing authorization data and wherein the first security module is further configured to receive a first authorization code and compare the first authorization code to first authorization data stored in the authorization data storage.

22. The computer-readable medium as claimed in claim 21, wherein the first security module is further configured to implement a first security operation upon determining that the first authorization code does not correspond to the first authorization data.

23. The computer-readable medium as claimed in claim 22, wherein the second security module is further configured to receive a second authorization code and compare the second authorization code to second authorization data stored in the authorization data storage.

24. The computer-readable medium as claimed in claim 23, wherein the second security module is further configured to implement a second security operation upon determining that the second authorization code does not correspond to the second authorization data.

* * * * *